March 19, 1929.  B. S. FLORADAY  1,705,472
BRAKE MECHANISM
Filed April 1, 1927   3 Sheets-Sheet 1

INVENTOR.
Burton S. Floraday.
BY Williams, Bradbury,
McCalet & Hinkle
ATTORNEYS

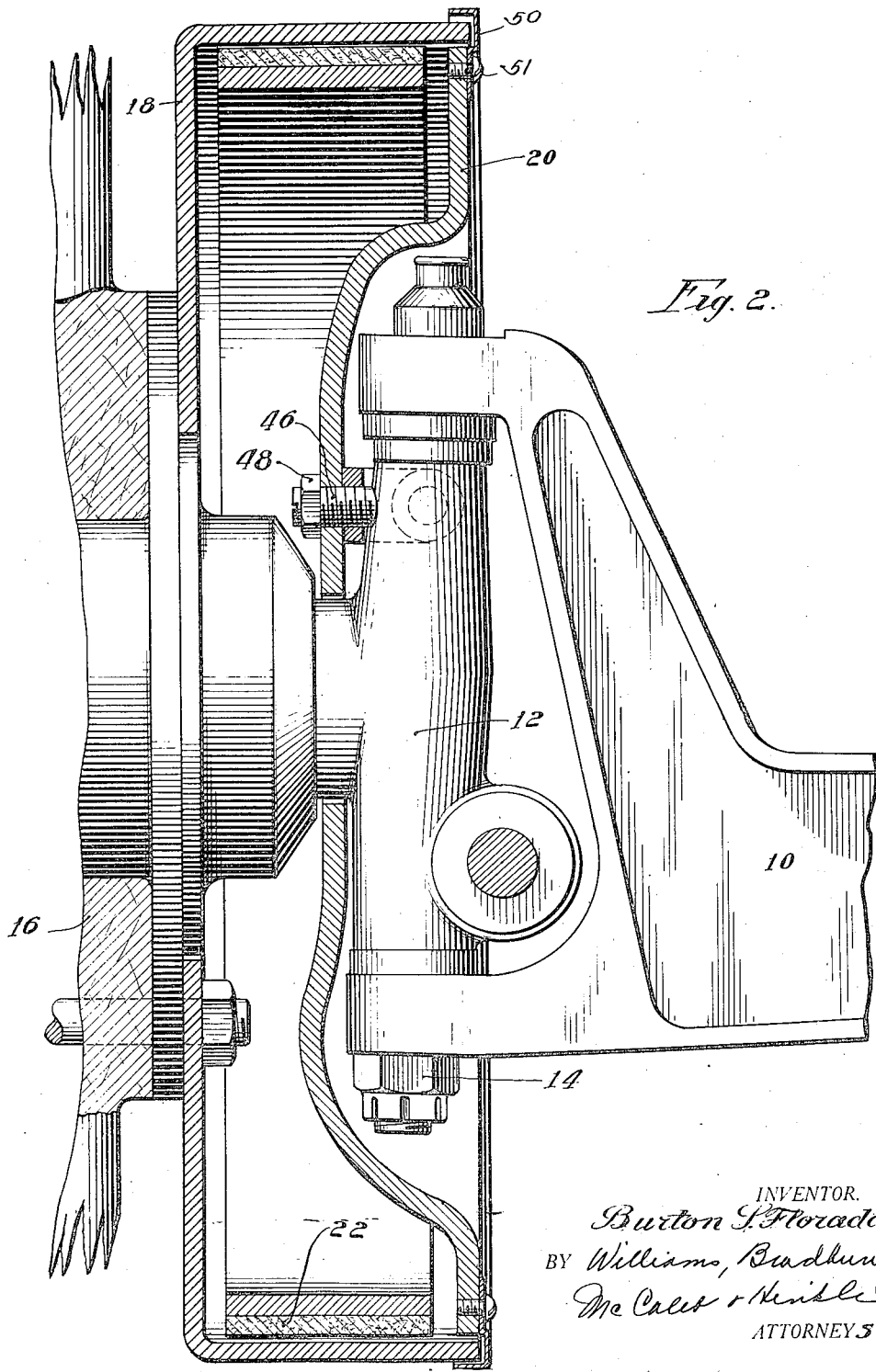

March 19, 1929.  B. S. FLORADAY  1,705,472
BRAKE MECHANISM
Filed April 1, 1927  3 Sheets-Sheet 3
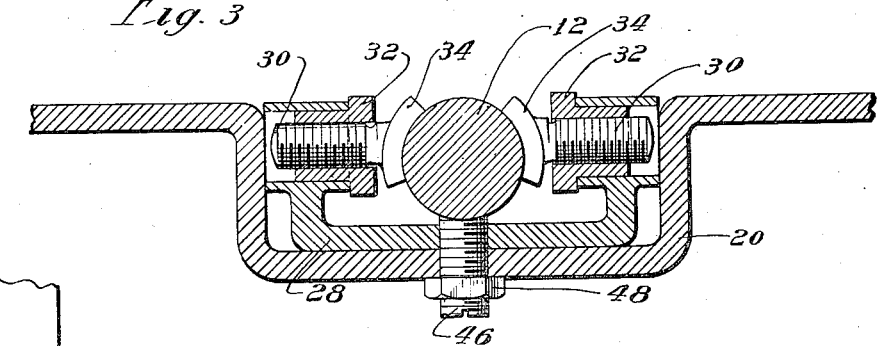
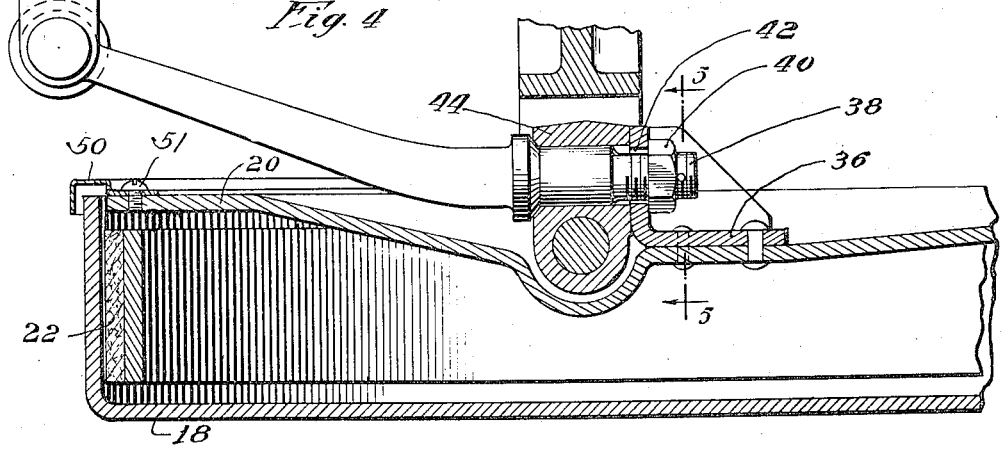
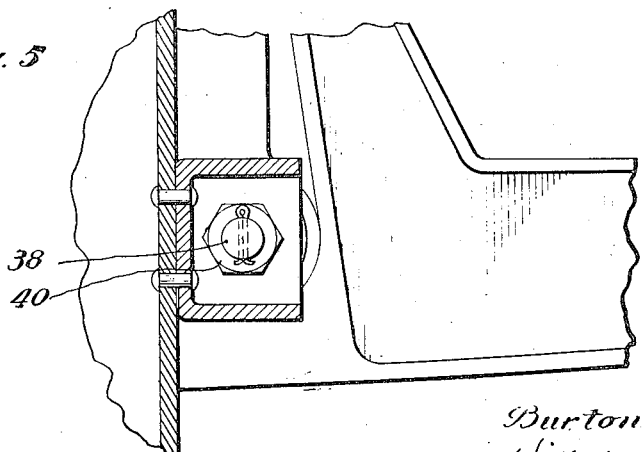
INVENTOR.
Burton S. Floraday.
BY Williams, Bradbury,
McCaleb & Hinkle
ATTORNEYS Patented Mar. 19, 1929.

1,705,472

UNITED STATES PATENT OFFICE.

BURTON S. FLORADAY, OF TOLEDO, OHIO, ASSIGNOR TO HYDRAULIC BRAKE COMPANY, OF DETROIT, MICHIGAN, A CORPORATION OF CALIFORNIA.

BRAKE MECHANISM.

Application filed April 1, 1927. Serial No. 180,100.

My invention relates to improvements in vehicle brakes and particularly to such brake construction as is adapted for use on motor vehicles.

In vehicle brake structure owing to quantity production employed in manufacturing plants and the use of interchangeable parts, it becomes necessary to adjust the relative position of the co-operating brake devices so that they will be so disposed with respect to each other as to be most effective in operation.

In the well known construction that consists of a brake drum mounted upon the wheel and a brake carrier supported by the axle, which carrier is provided with brake mechanism having working relationship with the drum it is often necessary to adjust the brake mechanism mounted upon the carrier so as to locate the same concentrically to the drum due to the fact that there is a variation when the parts are assembled from the normal intended position of such parts.

My improvement relates to structure so arranged that the brake carrier is adjustable as a unit eccentrically of the axle which supports the carrier so as to locate the brake devices mounted upon the carrier concentrically to the brake drum. The carrier is movable to and capable of support at a plurality of positions in its normal vertical plane and is also adapted to be tilted out of its normal vertical plane and supported at such tilted position. It is capable, therefore, of movement to any position necessary to properly locate the brake devices with respect to the drum.

The various features of construction and the advantages and improvements thereof will more fully appear in the following specification, appended claims and accompanying drawings, in which:

Fig. 2 is a vertical sectional view taken on line 2—2, Fig. 1.

Fig. 3 is a horizontal sectional view taken on line 3—3, Fig. 1.

Fig. 4 is a fragmentary horizontal sectional view taken on line 4—4, Fig. 1.

Fig. 5 is a fragmentary vertical sectional view taken on line 5—5, Fig. 1.

Figure 1:
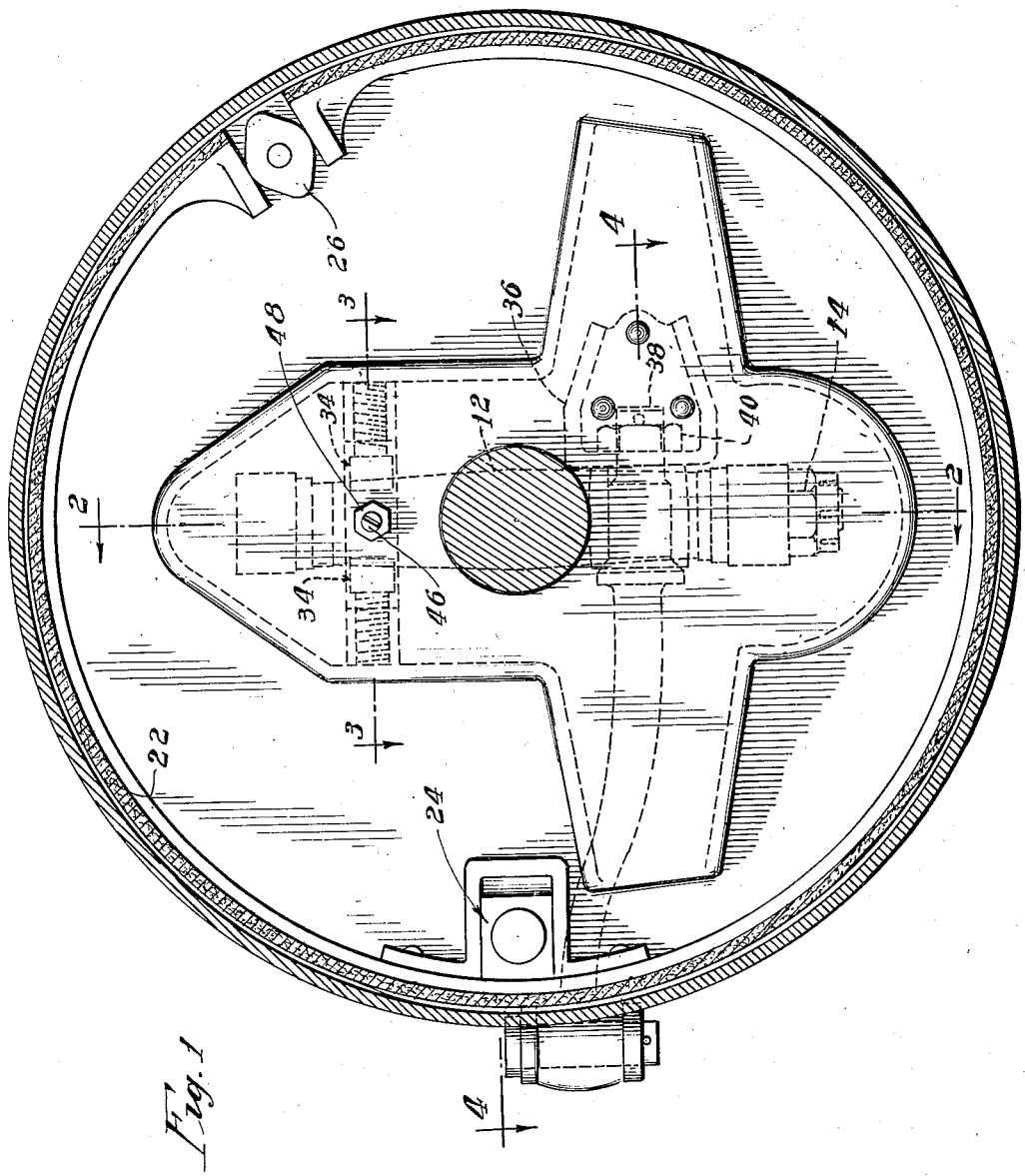
Figure 1 is a vertical sectional view through brake mechanism provided with my improvement.

I have shown my invention as applied to the front wheel of a vehicle in which 10 indicates an axle provided with a steering spindle 12 supported by the axle through the employment of a king bolt 14 and upon which is mounted a wheel 16. The brake drum 18 is carried by the wheel and is located substantially concentric to the spindle upon which the wheel is mounted. There is a brake carrier 20 here shown in the form of a metal plate which is supported upon the axle as hereinafter described and which in turn carries the brake band 22. This brake band may be anchored at 24 and an operating cam 26 may be provided to force the same against the brake drum.

My invention relates to a construction and arrangement of parts in such a fashion that the brake carrier is adjustable as a unit with respect to the axle upon which it is supported so as to properly locate the brake mechanism here shown in the form of a brake band with regard to the drum.

The brake carrier is recessed, as appears in Fig. 2, and as is shown in dotted outline in Fig. 1, and there is provided a bracket 28 secured to the carrier which bracket carries screw-threaded adjustable supports 30 adapted to be actuated through the rotation of nuts 32 to bring their arcuate faces 34 against the steering spindle 12 and through the relative actuation of such supporting devices. The brake carrier may be adjusted forward or backward with respect to the axle.

There is a second bracket 36 secured to the carrier and within which the steering arm that is engaged to the spindle is mounted. This steering arm has an extension 38 which carries a nut 40, which extension extends through an opening 42 in the bracket 36, which opening is over-size to permit the raising and lowering of the bracket carrier with respect to the steering arm which has a bearing at 44 in the spindle. By this means the carrier may be raised and lowered with respect to the axle and through tightening the supporting members 30 may be supported in such raised or lowered position, and as heretofore described, relative actuation of the supporting members 30 will serve to locate the carrier angularly with respect to its permitted location by virtue of raising and lowering the same.

The carrier, therefore, has a permitted movement to a plurality of positions eccentric of the axle within its normal vertical plane and is capable of support in any one of such positions.

Means are provided to tilt the carrier out of its normal vertical plane, which may be accomplished through the set-screw 46 which is provided with a nut 48 and the operation of which is apparent. It will, therefore, be seen that the carrier may be moved as a unit eccentrically to the axle upon which it is supported to bring the brake mechanism mounted thereon into proper location with respect to the brake drum and the carrier also be tilted out of normal vertical plane.

An annular dust guard 50 is secured to the brake collar 20 by screws 51 and overlies the edge of brake drum 18 to exclude extraneous substances from within the brake drum which might impair the efficiency of the brake lining.

What I claim is:

1. In a vehicle brake, an axle, a wheel on the axle and a brake drum on the wheel, a brake carrier supported upon the axle and adjustable to a plurality of eccentric positions thereon within its normal vertical plane and adapted to be tilted out of said vertical plane and supported in such tilted position.

2. In a vehicle brake, an axle, a wheel on the axle and a brake drum on the wheel, a brake carrier supported upon the axle, and means for tilting said carrier out of its normal vertical plane and supporting the same at such tilted position.

3. In a vehicle brake, an axle, a wheel on the axle and a brake drum on the wheel, a brake carrier supported upon the axle, said carrier adapted to be raised and lowered with respect to the axle and supported at a plurality of positions of such adjustment with respect thereto.

4. In a vehicle brake, an axle, a wheel on the axle and a brake drum on the wheel, a brake carrier provided with brake mechanism, said brake carrier supported upon the axle and adapted to be moved radially and supported at any one of a plurality of eccentric positions with respect to the axle to locate said brake mechanism concentrically to the brake drum.

5. In a vehicle brake, an axle, a wheel thereon, a brake drum on the wheel, a brake carrier supported on the axle and having a brake mechanism disposed within the brake drum, said brake carrier adjustable radially with respect to the axle to locate said brake mechanism concentrically of the brake drum.

6. In a vehicle brake, a wheel spindle, a wheel thereon, a brake drum on the wheel, a brake carrier supported upon the spindle, said carrier provided with brake mechanism located within the drum and having a working relationship therewith, said brake carrier movable radially as a unit with respect to the axle to positions eccentric to the spindle to vary the working relationship of the brake mechanism and the brake drum, and means adapted to support said carrier at any one of such positions.

7. In a vehicle brake, a wheel, a brake drum carried by the wheel, a brake carrier for supporting brake mechanism to cooperate with said brake drum, and means for supporting the brake carrier, said means being capable of adjustment of the carrier vertically and horizontally at will whereby the brake drum engaging part of the brake mechanism may be located concentrically to the brake drum.

8. In a vehicle brake, a wheel, a brake drum on the wheel, a brake carrier for supporting braking mechanism in cooperative relation with said drum and means for tilting said carrier out of its normal vertical plane and supporting the same at such tilted position.

In witness whereof, I hereunto subscribe my name this 25th day of March, 1927.

BURTON S. FLORADAY.